(12) United States Patent
Zhao (10) Patent No.: US 12,020,221 B2
(45) Date of Patent: Jun. 25, 2024

(54) PAYMENT PROCESSING METHOD, DEVICE AND SYSTEM (71) Applicant: NETSUNION CLEARING CORPORATION, Beijing (CN)

(72) Inventor: Shanbin Zhao, Beijing (CN)

(73) Assignee: NETSUNION CLEARING CORPORATION, Beijing (CN)

( * ) Notice: Subject to any disclaimer, the term of this patent is extended or adjusted under 35 U.S.C. 154(b) by 0 days.

(21) Appl. No.: 17/615,962

(22) PCT Filed: Nov. 26, 2020

(86) PCT No.: PCT/CN2020/131906
§ 371 (c)(1),
(2) Date: Dec. 2, 2021

(87) PCT Pub. No.: WO2021/135753
PCT Pub. Date: Jul. 8, 2021

(65) Prior Publication Data
US 2022/0207499 A1 Jun. 30, 2022

(30) Foreign Application Priority Data

Dec. 31, 2019 (CN) .......................... 201911424827.4

(51) Int. Cl.
G06Q 20/02 (2012.01)
G06Q 20/38 (2012.01)
G06Q 20/12 (2012.01)

(52) U.S. Cl.
CPC ....... *G06Q 20/023* (2013.01); *G06Q 20/3825* (2013.01); *G06Q 20/3829* (2013.01); *G06Q 20/12* (2013.01)

(58) Field of Classification Search
CPC ............. G06Q 20/023; G06Q 20/3825; G06Q 20/3829; G06Q 20/12
(Continued)

(56) References Cited

U.S. PATENT DOCUMENTS

2006/0235758 A1* 10/2006 Schleicher ........... G06Q 20/102
705/26.1
2011/0302081 A1 12/2011 Saunders et al.
(Continued)

FOREIGN PATENT DOCUMENTS

CN 105023146 A 11/2015
CN 108171489 A 6/2018
(Continued)

OTHER PUBLICATIONS

International Search Report issued in PCT/CN2020/131906 dated Mar. 1, 2021.
(Continued)

*Primary Examiner* — John W Hayes
*Assistant Examiner* — Cristina Owen Sherr
(74) *Attorney, Agent, or Firm* — Fox Rothschild LLP; Carol Thorstad-Forsyth (57) ABSTRACT A payment processing method is applied to a clearing system. The method includes receiving a payment request sent by a merchant end; digitally signing the payment request, and returning a response result to the merchant end, wherein the response result includes a routing jump address corresponding to an account end, so that the merchant end jumps to the account end according to the routing jump address, and sends the digitally signed payment request to an account backend system for verification through the account end, and after the verification of digital signature is passed, the account backend system performs payment operation corresponding to the payment request and obtains a payment operation result; and receiving the payment operation result sent by the account backend system, and returning the payment operation result to the merchant end.

7 Claims, 3 Drawing Sheets (58) Field of Classification Search
USPC .......................................................... 705/71
See application file for complete search history.

(56) References Cited

U.S. PATENT DOCUMENTS

| | | | |
|---|---|---|---|
| 2012/0136780 A1 | 5/2012 | El-Awady et al. | |
| 2013/0185214 A1* | 7/2013 | Azen .................. | G06Q 20/20 |
| | | | 705/76 |
| 2013/0191544 A1* | 7/2013 | Caldeira De Andrada .................. | |
| | | | H04W 76/15 |
| | | | 709/226 |
| 2014/0114852 A1 | 4/2014 | Rajagopal et al. | |
| 2015/0039510 A1 | 2/2015 | Drury et al. | |
| 2016/0239841 A1* | 8/2016 | Cao ...................... | G06Q 20/405 |
| 2017/0364910 A1 | 12/2017 | Malhotra et al. | |
| 2018/0241624 A1* | 8/2018 | Sun .................... | H04L 41/0895 |
| 2019/0139039 A1 | 5/2019 | Chawan et al. | |
| 2020/0104847 A1* | 4/2020 | Metnick ............... | G06Q 20/34 |
| 2021/0049560 A1* | 2/2021 | Kulpati ............... | G06F 16/2379 |

FOREIGN PATENT DOCUMENTS

| | | |
|---|---|---|
| CN | 109313754 A | 2/2019 |
| CN | 109323754 A | 2/2019 |
| CN | 109767200 A | 5/2019 |
| CN | 111192057 A | 5/2020 |
| JP | 2002109397 A | 4/2002 |

OTHER PUBLICATIONS

First Office Action issued in Chinese Patent Application No. 201911424827.4 dated Jun. 21, 2021.
"Industry Accounts Cross Network Payment Based on Payment Tokenlisation" May 4, 2017.
Anonymous: "javascript—Redirect based on operating system—Stack Overflow", Mar. 30, 2017 (Mar. 30, 2017), XP055942597, Retrieved from the Internet: URL:https://web.archive.org/web/2017033018 2034/https://stackoverflow.com/questions/3 0942774/redirect-based-on-operating-system [retrieved on Jul. 14, 2022.
Anonymous: "Browser detection using the user agent—HTTP I MON", Oct. 9, 2019 (Oct. 9, 2019), XP055942588, Retrieved from the Internet: URL:https://web.archive.org/web/2019100904 1024/https://developer.mozilla.org/en-US/docs/Web/HTTP/Browser_detection_using_the_user_agent [retrieved on Jul. 14, 2022].
Office Action issued in Japanese Patent Application No. 2022-503835 dated Jun. 28, 2022.

* cited by examiner

PAYMENT PROCESSING METHOD, DEVICE AND SYSTEM

CROSS REFERENCE TO RELATED APPLICATION

The present application is a U.S. National Phase of International Patent Application No. PCT/CN2020/131906 filed on Nov. 26, 2020 and entitled "PAYMENT PROCESSING METHOD, DEVICE AND SYSTEM", which claims priority to Chinese patent application No. 201911424827.4 filed by NetsUnion Clearing Corporation on Dec. 31, 2019 and entitled "Payment Processing Method, Device and System". The entireties of these applications are incorporated herein by reference.

TECHNICAL FIELD

The present disclosure relates to the field of network payment technology, and in particular to a payment processing method, device and system.

BACKGROUND

At present, users mainly use merchant software on mobile terminals for mobile online shopping, and make payments through account software. In a typical payment processing method, when the user selects the account software on the merchant software to pay for the merchant order, the merchant software interacts with the account backend system through the order receiving system and the clearing system to obtain the payment acceptance result and transaction voucher; the merchant software provides the transaction voucher to the account backend system for verification by using the account software routing jump method; after the verification is passed, the account backend system performs payment processing and returns the payment processing result to the mobile terminal.

In the above method, the interactive process link is lengthy and the payment processing efficiency is poor; moreover, the merchant software is generally routed to the account software through the SDK (Software Development Kit) which is highly dependent and is easy to cause routing failure and payment processing failure in situations such as merchant software upgrading, and thus the payment processing efficiency is reduced.

SUMMARY

The object of the present disclosure is to at least solve one of the above technical problems to a certain extent.

To this end, the first object of the present disclosure is to provide a payment processing method in which the interconnection among the order receiving system, the merchant end and the account end is realized by routing jumps at the merchant end and the account end through the clearing system and its unified signature and the routing jump address, and the process of the clearing system sending payment requests to the account backend system and obtaining acceptance results is reduced, thereby simplifying the interaction links among systems, reducing the complexity, improving the overall security of the system, and improving the overall payment processing efficiency.

The second object of the present disclosure is to provide a payment processing device.

The third object of the present disclosure is to provide a payment processing system.

In order to achieve the above objects, an embodiment of the first aspect of the present disclosure provides a payment processing method applied to a clearing system, comprising: receiving a payment request sent by a merchant end through an order receiving system; digitally signing the payment request, and returning a response result to the merchant end through the order receiving system, wherein the response result includes a routing jump address corresponding to an account end, so that the merchant end jumps to the account end according to the routing jump address, and sends the digitally signed payment request to an account backend system for verification through the account end, and after the verification of digital signature is passed, the account backend system performs payment operation corresponding to the payment request, and a payment operation result is obtained; and receiving the payment operation result sent by the account backend system, and returning the payment operation result to the merchant end through the order receiving system.

In the payment processing method applied to a clearing system according to the embodiment of the present disclosure, receiving a payment request sent by a merchant end through an order receiving system; digitally signing the payment request, and returning a response result to the merchant end through the order receiving system, wherein the response result includes a routing jump address corresponding to an account end, so that the merchant end jumps to the account end according to the routing jump address, and sends the digitally signed payment request to an account backend system for verification through the account end, and after the verification of digital signature is passed, the account backend system performs payment operation corresponding to the payment request, and a payment operation result is obtained; and receiving the payment operation result sent by the account backend system, and returning the payment operation result to the merchant end through the order receiving system. Thus, the interconnection among the order receiving system, the merchant end and the account end is realized by routing jumps at the merchant end and the account end through the clearing system and its unified signature and the routing jump address, and the process of the clearing system sending payment requests to the account backend system and obtaining acceptance results is reduced, thereby simplifying the interaction links among systems, reducing the complexity, improving the overall security of the system, and improving the overall payment processing efficiency.

In order to achieve the above objects, an embodiment of the second aspect of the present disclosure provides a payment processing device applied to a clearing system, comprising: a receiving module configured to receive a payment request sent by a merchant end through an order receiving system; a signing module configured to digitally sign the payment request, and return a response result to the merchant end through the order receiving system, wherein the response result includes a routing jump address corresponding to an account end, so that the merchant end jumps to the account end according to the routing jump address, and sends the digitally signed payment request to an account backend system for verification through the account end, and after the verification of digital signature is passed, the account backend system performs a payment operation corresponding to the payment request and obtains a payment operation result; and a returning module configured to receive the payment operation result sent by the account backend system, and return the payment operation result to the merchant end through the order receiving system.

In the payment processing device applied to a clearing system according to the embodiment of the present disclosure, receiving a payment request sent by a merchant end through an order receiving system; digitally signing the payment request, and returning a response result to the merchant end through the order receiving system, wherein the response result includes a routing jump address corresponding to an account end, so that the merchant end jumps to the account end according to the routing jump address, and sends the digitally signed payment request to an account backend system for verification through the account end, and after the verification of digital signature is passed, the account backend system performs payment operation corresponding to the payment request, and a payment operation result is obtained; and receiving the payment operation result sent by the account backend system, and returning the payment operation result to the merchant end through the order receiving system. Thus, the interconnection among the order receiving system, the merchant end and the account end is realized by routing jumps at the merchant end and the account end through the clearing system and its unified signature and the routing jump address, and the process of the clearing system sending payment requests to the account backend system and obtaining acceptance results is reduced, thereby simplifying the interaction links among systems, reducing the complexity, improving the overall security of the system, and improving the overall payment processing efficiency.

In order to achieve the above objects, an embodiment of the third aspect of the present disclosure provides a payment processing system, comprising: a merchant end installed on a terminal equipment, an order receiving system, a clearing system, an account backend system and an account end; the order receiving system is connected to the merchant end and the clearing system respectively; the account backend system is connected to the clearing system and the account end respectively; the merchant end is configured to send a payment request to the clearing system through the order receiving system when a user selects the account end for order payment; the clearing system is configured to digitally sign the payment request, and return a response result to the merchant end through the order receiving system, wherein the response result includes a routing jump address corresponding to the account end; the merchant end is configured to jump to the account end according to the routing jump address, and send the digitally signed payment request to the account backend system for verification through the account end; the account backend system is configured to verify the payment request digitally signed, and after the verification of digital signature is passed, perform a payment operation corresponding to the payment request, obtain a payment operation result and return it to the clearing system; and the clearing system is further configured to return the payment operation result to the merchant end through the order receiving system.

Some of additional aspects and advantages of the present disclosure will be given in the following description, and some will become obvious from the following description or be learned through the practice of the present disclosure.

BRIEF DESCRIPTION OF DRAWINGS

The above and/or additional aspects and advantages of the present disclosure will become obvious and easy to understand from the following description of the embodiments in conjunction with the accompanying drawings. In the drawings.

DETAILED DESCRIPTION

The embodiments of the present disclosure will be described in detail below. Examples of the embodiments are shown in the accompanying drawings, throughout which the same or similar reference numerals indicate the same or similar elements or elements having the same or similar functions. The embodiments described below with reference to the drawings are exemplary, and are intended to explain the present disclosure, but should not be understood as a limitation to the present disclosure.

The payment processing method, device, and system according to the embodiments of the present disclosure will be described below with reference to the accompanying drawings.

Figure 1:
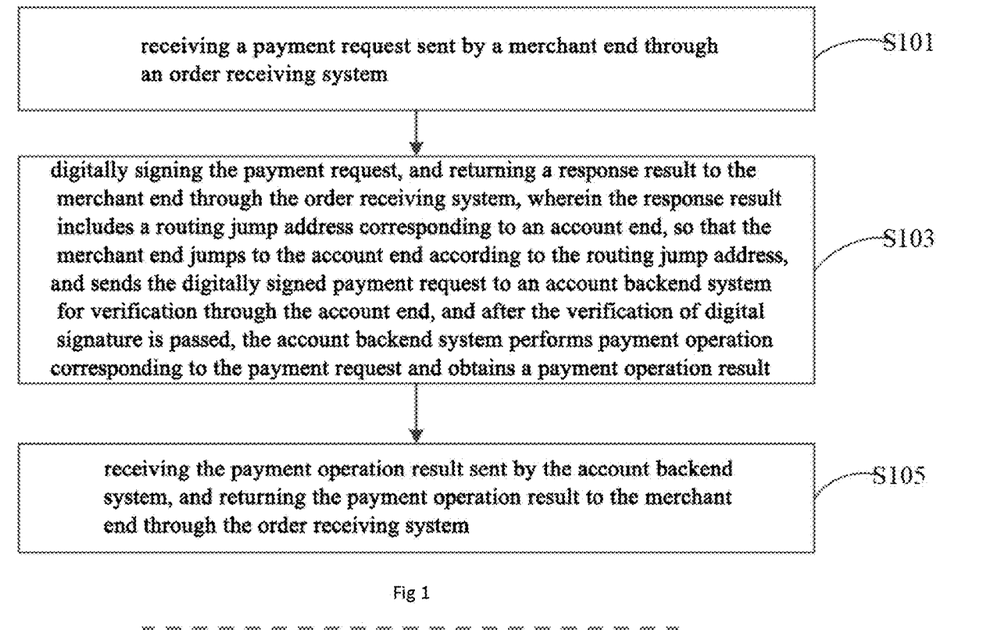
FIG. 1 is a schematic flowchart of a payment processing method according to an embodiment of the present disclosure.

FIG. 1 is a schematic flowchart of a payment processing method according to an embodiment of the present disclosure. The main executor of the payment processing method according to the embodiment of the present disclosure is a payment processing device, which can be applied to a payment processing system. Participants of the payment processing system may include a user (i.e., a payer), a merchant (i.e., a payee), a merchant end installed on a terminal equipment, an order receiving system, an account end, an account backend system, and a clearing system. Among them, the user binds the physical capital account through the account end on the terminal device. The merchant pays for the order receiving service by using the merchant end provided by the order receiving system, and accepts the payment to the merchant completed by the user through the account end. The account end and the account backend system are responsible for creating accounts for users and providing account services and cross-institutional account agency services, receiving and processing payment instructions forwarded by the clearing system, and managing the funds of users. The order receiving system is responsible for merchant access and management, receiving and processing payment instructions from the clearing institution system, conducting transaction processing, and handling merchant's order receiving fund settlement. The clearing system is responsible for the receiving and processing of payment instructions, the clearing and settlement of transaction funds, and plays the role of transaction intermediary transfer and fund clearing in the payment business.

As shown in FIG. 1, the payment processing method comprises the following steps:

S101: receiving a payment request sent by a merchant end through an order receiving system.

In the embodiment of the present disclosure, the merchant end is installed on the terminal device, and the clearing system receives the payment request sent by the merchant end through the order receiving system. For example, the mobile terminal is installed with merchant software, the user uses the merchant software for online shopping, and when the user selects the account software on the merchant software to pay for the merchandise order, the merchant software sends a payment request to the clearing system through the order receiving system, and the clearing system receives the payment request sent by the order receiving system. The merchant software may be Taobao, Jingdong, etc. The account software may be WeChat, Alipay, etc.

S103, digitally signing the payment request, and returning a response result to the merchant end through the order receiving system, wherein the response result includes a routing jump address corresponding to an account end, so that the merchant end jumps to the account end according to the routing jump address, and sends the digitally signed payment request to an account backend system for verification through the account end, and after the verification of digital signature is passed, the account backend system performs payment operation corresponding to the payment request and obtains a payment operation result.

Further, after receiving the payment request sent by the order receiving system, the clearing system digitally signs the payment request, and returns a response result to the order receiving system, and the order receiving system returns the response result to the merchant end. Wherein the response result may include, but is not limited to, a routing jump address corresponding to an account end, so that the merchant end jumps to the account end according to the routing jump address, and sends the digitally signed payment request to an account backend system for verification through the account end, and after the verification of digital signature is passed, the account backend system performs payment operation corresponding to the payment request and obtains a payment operation result.

It should be noted that the routing jump address is of an international standard format. In order to realize a uniform URL (Uniform Resource Locator) routing jump between the merchant end and the account end through the clearing system to realize the interconnection between the software. In the embodiment of the present disclosure, the payment request is digitally signed, and before returning the response result to the merchant end through the order receiving system, the clearing system receives the routing jump address that is corresponding to the account end and reported by the account backend system, saves the routing jump address, and establishes a corresponding relationship between the routing jump address and the account end.

Further, after the clearing system received the routing jump address that is corresponding to the account end and reported by the account backend system, the clearing system acquires a plurality of types of operating system, and indicators corresponding to the types one-to-one; and adds the indicators to the routing jump address respectively to obtain a plurality of enhanced routing jump addresses corresponding to the types. Correspondingly, saving the routing jump address, and establishing a corresponding relationship between the routing jump address and the account end is specifically: saving the enhanced routing jump addresses, and establishing a corresponding relationship among the enhanced routing jump addresses, the account ends and the types of operating system.

In other words, after received the routing jump address that is corresponding to the account end and reported by the account backend system, the clearing system may acquire a plurality of types of operating system of the terminal device where the account end is installed, such as Android, IOS (iPhone Operation System, i.e., Apple's mobile operating system), etc. Then, the indicator corresponding to the type of the operating system is obtained (i.e., the type of the operating system of the terminal device where the account end is installed can be obtained through the indicator), and then the indicator is added to the route jump address respectively to obtain an enhanced routing jump addresses corresponding to the type of operating system. Finally, the enhanced routing jump address is saved, and the corresponding relationship among the enhanced routing jump addresses, the account end and the types of operating system is established.

Further, in the process of the clearing system returning the response result to the merchant end through the order receiving system, the clearing system may acquire a type of operating system in a terminal device where the merchant end is installed as a type to be responded; query a corresponding relationship of the account end according to the type to be responded, and obtain the enhanced routing jump address that has a corresponding relationship with the type to be responded and the account end as an enhanced routing jump address to be responded; and add the enhanced routing jump address to be responded into the response result, and return it to the merchant end.

In other words, the clearing system queries the corresponding relationship with the account end according to the type of operating system of the terminal device where the merchant end is installed; obtains, according to the corresponding relationship, from the saved enhanced routing jump addresses, an enhanced routing jump address that has established a corresponding relationship with the type of operating system and the account end; and adds the enhanced routing jump address to the response result, and returns it to the merchant end.

In the present disclosure, the use of the enhanced routing jump address enables the merchant end to directly jump to the account end according to the enhanced routing jump address, thereby avoiding the need to use a browser when jumping according to a non-enhanced routing jump address and improving the jump speed.

In the present disclosure, the use and provision of the routing jump address enables the order receiving system and the merchant end to support all account ends by using only one route jump method, thereby reducing costs of integration, operation and maintenance. Moreover, the routing jump address is of an international standard format, supports commonly used operating systems, has high compatibility, and improves the overall payment success rate.

In addition, it should be noted that the merchant end and the account end may be installed on one terminal device or on different terminal devices.

In order to ensure the privacy and security of payment information, when the payment request is digitally signed, the payment request is encrypted using a public key of the account backend system, the encrypted payment request is digitally signed using a private key of the clearing system, and a response result is returned to the merchant end through the order receiving system, so that after the merchant end sends the digitally signed payment request to the account backend system through the account end, the account backend system verifies the digitally signed payment request using the public key of the clearing system, decrypts the verified payment request using the private key of the account backend system, and confirms that the verification is passed when the payment request is successfully decrypted. As a result, the privacy and security of payment information is guaranteed. It should be noted that the public key of the clearing system can be obtained when the account backend system is connected to the network.

S105: receiving the payment operation result sent by the account backend system, and returning the payment operation result to the merchant end through the order receiving system.

Specifically, after receiving the payment operation result sent by the account backend system, the clearing system returns the payment operation result to the merchant end through the order receiving system so that the user can view the payment operation result.

In sum, the interconnection among the order receiving system, the merchant end and the account end is realized by routing jumps at the merchant end and the account end through the clearing system and its unified signature and the routing jump address, thereby simplifying the interaction links among systems, reducing the complexity, improving the overall security of the system, and improving the overall payment processing efficiency.

In order to better illustrate the above embodiments, an example is now described.

Figure 2:
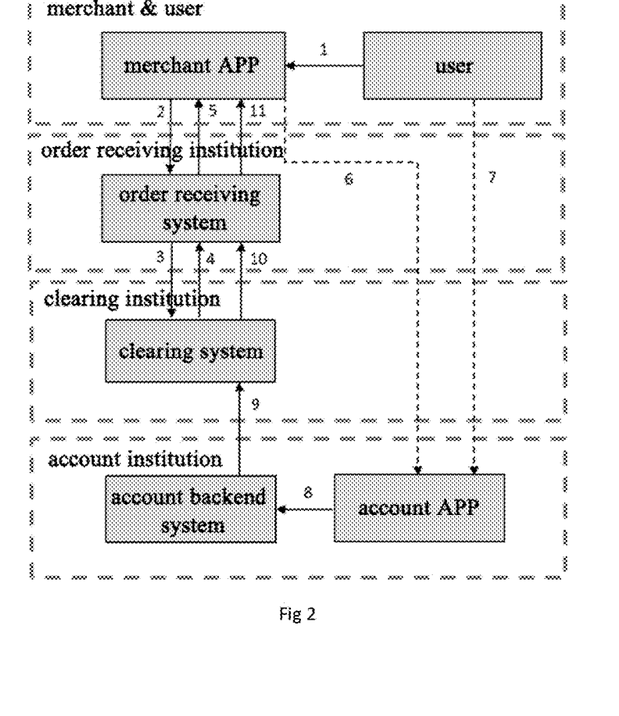
FIG. 2 is a schematic flowchart of a payment processing method according to another embodiment of the present disclosure.

For example, as shown in FIG. 2, FIG. 2 shows a payment processing method according to an embodiment of the present disclosure. The specific implementation process is as follows:

Step 1: the user selects the account APP (i.e., application) in the merchant APP on the terminal device to pay for the merchant order;

Step 2: the merchant APP sends a payment application (i.e., a payment request) to the order receiving system;

Step 3: the order receiving system sends the payment application to the clearing system;

Step 4: the clearing system accepts and digitally signs the payment application, and then returns an acceptance result (i.e., a response result), signature content, and unified APP routing URL (Universal Resource Locater) to the order receiving system. The account backend system reports the URL to the clearing institution in advance. The account backend system may also perform user experience enhancement on URLs using Universal Links, App Links and other technologies. The clearing system saves the enhanced routing jump address, and establishes a corresponding relationship among the enhanced routing jump address, the account end and the operation type;

Step 5: the enhanced routing jump address corresponding to the operating system type is acquired according to the operating system type of the merchant APP, and the order receiving system returns the enhanced routing jump URL and payment information to the merchant APP;

Step 6: the merchant APP jumps to the account APP according to the URL routing, and transfers the payment request of the order receiving system and the digital signature content of the clearing system. The account backend system verifies the signature of the payment request, and then displays the order information to the user;

Step 7: the user authorizes the account institution to deduct money;

Step 8: the account APP informs the account backend system to process the deduction;

Step 9: the account backend system notifies the clearing system of the result of deduction;

Step 10: the clearing system notifies the order receiving system of the payment result (i.e., payment operation result);

Step 11: the order receiving system notifies the merchant APP of the payment result.

In the payment processing method applied to a clearing system according to the embodiment of the present disclosure, receiving a payment request sent by a merchant end through an order receiving system; digitally signing the payment request, and returning a response result to the merchant end through the order receiving system, wherein the response result includes a routing jump address corresponding to an account end, so that the merchant end jumps to the account end according to the routing jump address, and sends the digitally signed payment request to an account backend system for verification through the account end, and after the verification of digital signature is passed, the account backend system performs payment operation corresponding to the payment request, and a payment operation result is obtained; and receiving the payment operation result sent by the account backend system, and returning the payment operation result to the merchant end through the order receiving system. Thus, the interconnection among the order receiving system, the merchant end and the account end is realized by routing jumps at the merchant end and the account end through the clearing system and its unified signature and the routing jump address, and the one-touch access and business interconnection capability of merchant software and account software are realized by unified interface standard and unified software routing jump specification, thereby improving the compatibility, simplifying the interaction links among systems, reducing the complexity, improving the overall security of the system, and improving the overall payment processing efficiency.

Figure 3:
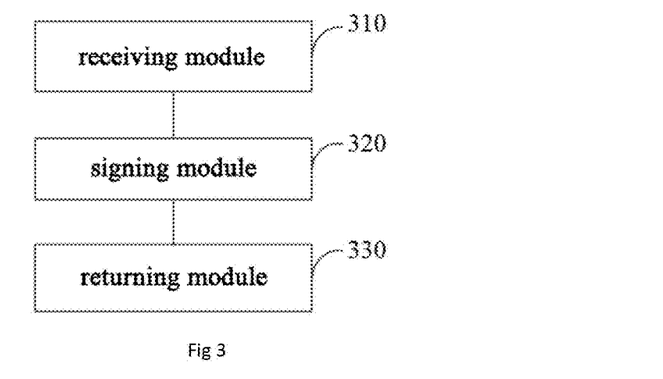
FIG. 3 is a schematic diagram of the structure of a payment processing device according to an embodiment of the present disclosure.

Corresponding to the payment processing methods according to the foregoing embodiments, an embodiment of the present disclosure also provides a payment processing device. Since the payment processing device according to the embodiment of the present disclosure corresponds to the payment processing methods according to the foregoing several embodiments, the foregoing embodiments of the payment processing method are also applicable to the payment processing device according to the present embodiment, which will not be described in detail herein. FIG. 3 is a schematic diagram of the structure of a payment processing device according to an embodiment of the present disclosure. As shown in FIG. 3, the payment processing device includes: a receiving module 310, a signing module 320, and a returning module 330.

The receiving module 310 is configured to receive a payment request sent by a merchant end through an order receiving system. The signing module 320 is configured to digitally sign the payment request, and return a response result to the merchant end through the order receiving system, wherein the response result includes a routing jump address corresponding to an account end, so that the merchant end jumps to the account end according to the routing jump address, and sends the digitally signed payment request to an account backend system for verification through the account end, and after the verification of digital signature is passed, the account backend system performs a payment operation corresponding to the payment request and obtains a payment operation result. The returning module 330 is configured to receive the payment operation result sent by the account backend system, and returning the payment operation result to the merchant end through the order receiving system.

Figure 4:
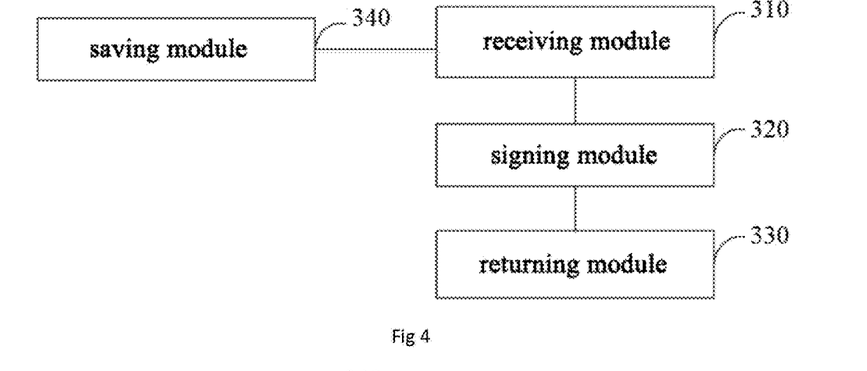
FIG. 4 is a schematic diagram of the structure of a payment processing device according to another embodiment of the present disclosure.

As a possible implementation manner of the embodiment of the present disclosure, as shown in FIG. 4, on the basis of FIG. 3, the payment processing device further comprises a saving module 340.

The saving module 340 is configured to save the routing jump address, and establishing a corresponding relationship between the routing jump address and the account end.

As a possible implementation of the embodiment of the present disclosure, the routing jump address is of an international standard format.

Figure 5:
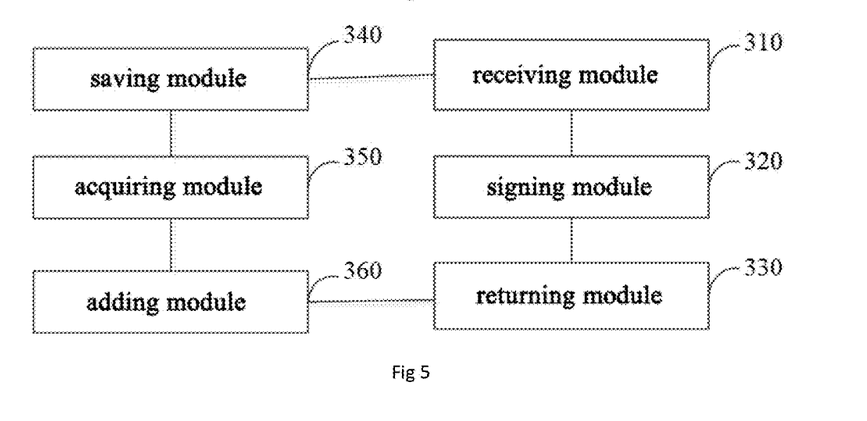
FIG. 5 is a schematic diagram of the structure of a payment processing device according to still another embodiment of the present disclosure.

As a possible implementation manner of the embodiment of the present disclosure, as shown in FIG. 5, on the basis of FIG. 4, the payment processing device further comprises an acquiring module 350 and an adding module 360.

The acquiring module 350 is configured to acquire a plurality of types of operating system, and indicators corresponding to the types one-to-one. The adding module 360 is configured to add the indicators to the routing jump address respectively to obtain a plurality of enhanced routing jump addresses corresponding to the types. Correspondingly, the saving module 340 is specifically configured to save the enhanced routing jump addresses, and establish a corresponding relationship among the enhanced routing jump addresses, the account end and the types of operating system.

As a possible implementation of the embodiment of the present disclosure, the return module 330 is specifically configured to acquire a type of an operating system in a terminal device where the merchant end is installed as a type to be responded; query a corresponding relationship of the account end according to the type to be responded, and obtain the enhanced routing jump address that has a corresponding relationship with the type to be responded and the account end as an enhanced routing jump address to be responded; and add the enhanced routing jump address to be responded into the response result and return the response result to the merchant end.

As a possible implementation of the embodiments of the present disclosure, the signing module 320 is specifically configured to encrypt the payment request using a public key of the account backend system, digitally sign the encrypted payment request using a private key of the clearing system, and return a response result to the merchant end through the order receiving system, so that after the merchant end sends the digitally signed payment request to the account backend system through the order receiving system, the account backend system verifies the digitally signed payment request using the public key of the clearing system, decrypts the verified payment request using the private key of the account backend system, and confirms that the verification is passed when the payment request is successfully decrypted.

In the payment processing device applied to a clearing system according to the embodiment of the present disclosure, receiving a payment request sent by a merchant end through an order receiving system; digitally signing the payment request, and returning a response result to the merchant end through the order receiving system, wherein the response result includes a routing jump address corresponding to an account end, so that the merchant end jumps to the account end according to the routing jump address, and sends the digitally signed payment request to an account backend system for verification through the account end, and after the verification of digital signature is passed, the account backend system performs payment operation corresponding to the payment request, and a payment operation result is obtained; and receiving the payment operation result sent by the account backend system, and returning the payment operation result to the merchant end through the order receiving system. Thus, the interconnection among the order receiving system, the merchant end and the account end is realized by routing jumps at the merchant end and the account end through the clearing system and its unified signature and the routing jump address; the one-touch access and business interconnection capability of merchant software and account software are realized by unified interface standard and unified software routing jump specification, thereby improving the compatibility, simplifying the interaction links among systems, reducing the complexity, improving the overall security of the system, and improving the overall payment processing efficiency.

Figure 6:
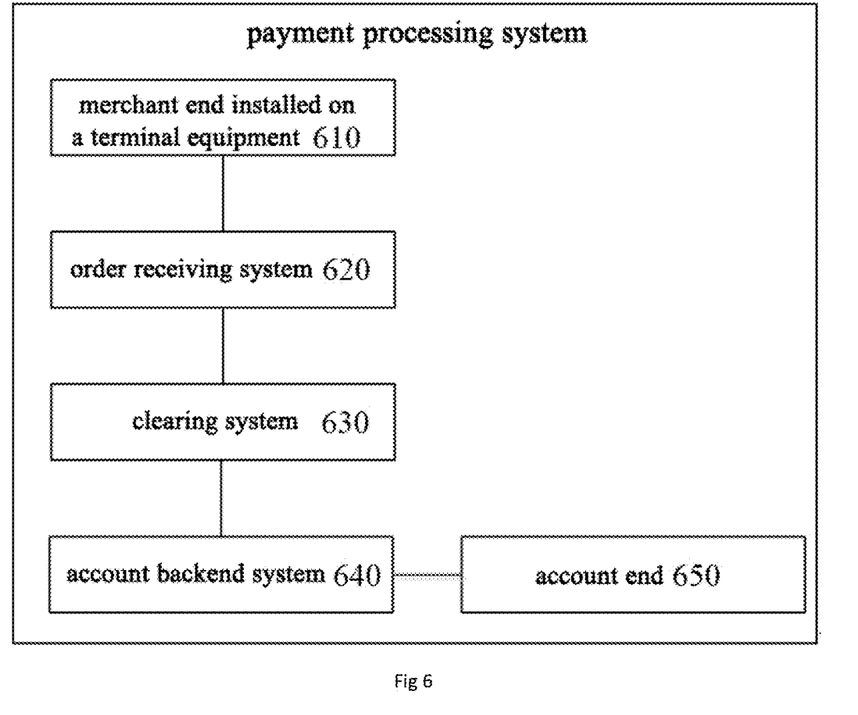
FIG. 6 is a schematic diagram of the structure of a payment processing system according to an embodiment of the present disclosure.

In order to implement the foregoing embodiments, the present disclosure also provides a payment processing system, as shown in FIG. 6 which is a schematic diagram of the structure of the payment processing system according to an embodiment of the application, the payment processing system comprises: a merchant end 610 installed on a terminal equipment, an order receiving system 620, a clearing system 630, an account backend system 640, and an account end 650.

Among them, the order receiving system 620 is connected to the merchant end 610 and the clearing system 630 respectively; the account backend system 640 is connected to the clearing system 630 and the account end 650 respectively; the merchant end 610 sends a payment request to the clearing system 630 through the order receiving system 620 when a user selects the account end 650 for order payment; the clearing system 630 is configured to digitally sign the payment request, and return a response result to the merchant end 610 through the order receiving system 620, wherein the response result includes a routing jump address corresponding to an account end 650; the merchant end 610 is configured to jump to the account end 650 according to the routing jump address, and send the digitally signed payment request to an account backend system 640 for verification through the account end 650; the account backend system 640 is configured to verify the payment request digitally signed, and after the verification of digital signature is passed, perform a payment operation corresponding to the payment request, obtain a payment operation result and returning it to the clearing system 630; the clearing system 630 is further configured to return the payment operation result to the merchant end 610 through the order receiving system 620.

In the specification, the description of the terms "one embodiment", "some embodiments", "an example", "a specific example", or "some examples" and the like means the specific features, structures, materials, or characteristics described in connection with the embodiment or example are included in at least one embodiment or example of the present disclosure. In the specification, the schematic representations of the above terms do not necessarily refer to the same embodiment or example. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art if there is no conflict.

In addition, the terms "first" and "second" are used for descriptive purposes only and are not to be construed as indicating or implying relative importance or implicitly indicating the number of indicated technical features. Thus, features with "first" and "second" may explicitly or implicitly include at least one of the features. In the description of the present disclosure, "a plurality of" means at least two, such as two, three, etc., unless expressly defined otherwise.

Any process or method described in flowcharts or otherwise herein may be understood as representing modules, segments or portions of code that include one or more executable instructions for implementing the steps of a particular logic function or process. The scope of the preferred embodiments of the present disclosure includes other implementations where the functions may not be performed in the order shown or discussed (including, according to the functions involved, in substantially simultaneous or in reverse order), which should be understood by those skilled in the art to which the embodiment of the present disclosure belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). As to this specification, the "computer-readable medium" may be any device that may contain, store, communicate, propagate, or transport the program for use by or in connection with the instruction execution system, device, or apparatus. More specific examples (non-exhaustive list) of the computer-readable media include: an electrical connection part (electronic device) with one or more wirings, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium on which the program can be printed, because the program can be obtained electronically, for example, by optically scanning the paper or other medium, and then edited, interpreted, or processed in other suitable way if necessary, and then stored in the computer memory.

It should be understood that various portions of the present disclosure may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, specific integrated circuits with suitable combinational logic gate circuits, programmable gate arrays (PGA), field programmable gate arrays (FPGAs), and the like.

Those skilled in the art may understand that the implementation of all or some of the steps of the methods in the foregoing embodiments may be completed by hardware instructed by a program. The program may be stored in a computer-readable storage medium, and when executed, one of the steps or a combination thereof of the method according to the embodiments is implemented.

In addition, each of the functional units in the embodiments of the present disclosure may be integrated in a processing module; alternatively, each of the units may exist alone physically; alternatively, two or more units may be integrated in one module. The above integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The embodiments of the present disclosure have been described above. However, it should be understood that the above embodiments are exemplary, and should not be construed to limit the present disclosure. Those skilled in the art can make variations, modifications, substitutions and, improvements to the above embodiments within the scope of the present disclosure.

What is claimed is:

1. A payment processing method applied to a clearing system, comprising:
   receiving a payment request sent by a merchant software installed on a terminal device through an order receiving system;
   digitally signing the payment request, and returning a response result to the merchant software through the order receiving system, wherein the response result includes the routing jump address corresponding to the account software, so that the merchant software jumps to the account software according to the routing jump address, and sends the digitally signed payment request to an account backend system for verification through the account software, and after the verification of digital signature is passed, the account backend system performs payment operation corresponding to the payment request and obtains a payment operation result, wherein the routing jump address is an enhanced routing jump address corresponding to a type of an operating system of terminal device obtained by adding an indicator corresponding to the type of the operating system to the routing jump address, and the enhanced routing jump address has a corresponding relationship with the account software and the type of the operating system; and
   receiving the payment operation result sent by the account backend system, and returning the payment operation result to the merchant software through the order receiving system;
   wherein before digitally signing the payment request and returning a response result to the merchant software through the order receiving system, the method further comprises:
   receiving the routing jump address that is corresponding to the account software and reported by the account backend system;
   saving the routing jump address, and establishing a corresponding relationship between the routing jump address and the account software;
   wherein after receiving the routing jump address that is corresponding to the account software and reported by the account backend system, the method further comprises:
   acquiring a plurality of types of operating system, and indicators corresponding to the types one-to-one; and
   adding the indicators to the routing jump address respectively to obtain a plurality of enhanced routing jump addresses corresponding to the types;

correspondingly, saving the routing jump address, and establishing a corresponding relationship between the routing jump address and the account software is specifically:
saving the enhanced routing jump addresses, and establishing a corresponding relationship among the enhanced routing jump addresses, the account software and the types of operating system;
wherein returning a response result to the merchant software through the order receiving system comprises:
acquiring a type of an operating system in a terminal device where the merchant software is installed as a type to be responded;
querying a corresponding relationship of the account software according to the type to be responded, and obtaining the enhanced routing jump address that has a corresponding relationship with the type to be responded and the account software as an enhanced routing jump address to be responded; and
adding the enhanced routing jump address to be responded into the response result and returning it to the merchant software.

2. The method according to claim 1, wherein the routing jump address is of an international standard format.

3. The method according to claim 1, wherein digitally signing the payment request, and returning a response result to the merchant software through the order receiving system comprises:
encrypting the payment request using a public key of the account backend system, digitally signing the encrypted payment request using a private key of the clearing system, and returning a response result to the merchant software through the order receiving system, so that after the merchant software sends the digitally signed payment request to the account backend system through the order receiving system, the account backend system verifies the digitally signed payment request using the public key of the clearing system, decrypts the verified payment request using the private key of the account backend system, and confirms that the verification is passed when the payment request is successfully decrypted.

4. A payment processing device applied to a clearing system, comprising:
a memory for storing a computer program; and
a processor for executing the computer program;
wherein the processor is for
receiving a payment request sent by a merchant software installed on a terminal device through an order receiving system;
digitally signing the payment request, and returning a response result to the merchant software through the order receiving system, wherein the response result includes the routing jump address corresponding to an account software, so that the merchant software jumps to the account software according to the routing jump address, and sends the digitally signed payment request to the account backend system for verification through the account software, and after the verification of digital signature is passed, the account backend system performs a payment operation corresponding to the payment request and obtains a payment operation result, wherein the routing jump address is an enhanced routing jump address corresponding to a type of an operating system of terminal device obtained by adding an indicator corresponding to the type of the operating system to the routing jump address, and the enhanced routing jump address has a corresponding relationship with the account software and the type of the operating system; and
receiving the payment operation result sent by the account backend system, and return the payment operation result to the merchant software through the order receiving system;
wherein the processor is specifically for:
receiving the routing jump address that is corresponding to the account software and reported by the account backend system;
saving the routing jump address, and establishing a corresponding relationship between the routing jump address and the account software;
wherein after receiving the routing jump address that is corresponding to the account software and reported by the account backend system, the processor is specifically for:
acquiring a plurality of types of operating system, and indicators corresponding to the types one-to-one; and
adding the indicators to the routing jump address respectively to obtain a plurality of enhanced routing jump addresses corresponding to the types;
saving the enhanced routing jump addresses, and establish a corresponding relationship among the enhanced routing jump addresses, the account software and the types of operating system;
wherein returning a response result to the merchant software through the order receiving system comprises:
acquiring a type of an operating system in a terminal device where the merchant software is installed as a type to be responded;
querying a corresponding relationship of the account software according to the type to be responded, and obtaining the enhanced routing jump address that has a corresponding relationship with the type to be responded and the account software as an enhanced routing jump address to be responded; and
adding the enhanced routing jump address to be responded into the response result and returning it to the merchant software.

5. The device according to claim 4, wherein the routing jump address is of an international standard format.

6. The device according to claim 4, wherein the processor is specifically for:
encrypting the payment request using a public key of the account backend system, digitally signing the encrypted payment request using a private key of the clearing system, and returning a response result to the merchant software through the order receiving system, so that after the merchant software sends the digitally signed payment request to the account backend system through the order receiving system, the account backend system verifies the digitally signed payment request using the public key of the clearing system, decrypts the verified payment request using the private key of the account backend system, and confirms that the verification is passed when the payment request is successfully decrypted.

7. The method according to claim 2, wherein digitally signing the payment request, and returning a response result to the merchant software through the order receiving system comprises:
encrypting the payment request using a public key of the account backend system, digitally signing the encrypted payment request using a private key of the clearing system, and returning a response result to the merchant software through the order receiving system, so that after the merchant software sends the digitally signed payment request to the account backend system through the order receiving system, the account backend system verifies the digitally signed payment request using the public key of the clearing system, decrypts the verified payment request using the private key of the account backend system, and confirms that the verification is passed when the payment request is successfully decrypted.

* * * * *